United States Patent [19]

Nelson et al.

[11] Patent Number: 5,216,919
[45] Date of Patent: Jun. 8, 1993

[54] FUEL LEVEL SENDER

[75] Inventors: Steve D. Nelson, Bradenton; Jim S. Leonard, Parish; Jim Zimnicki, Bradenton, all of Fla.

[73] Assignee: Teleflex Incorporated, Limerick, Pa.

[21] Appl. No.: 816,873

[22] Filed: Jan. 2, 1992

[51] Int. Cl.⁵ .............................................. G01F 23/26
[52] U.S. Cl. ........................................ 73/317; 338/33
[58] Field of Search ................... 73/317, 309; 338/33, 338/157; 340/625

[56] References Cited

U.S. PATENT DOCUMENTS

| | | | |
|---|---|---|---|
| 317,289 | 5/1885 | Boyle | 338/33 X |
| 1,476,289 | 12/1923 | Feder | 338/157 X |
| 2,060,114 | 11/1936 | Podolsky | 338/157 X |
| 2,120,771 | 6/1938 | Thompson | 338/157 X |
| 2,309,798 | 2/1943 | Stoekle et al. | 338/157 |
| 2,434,425 | 1/1948 | Muller . | |
| 2,651,200 | 9/1953 | Colburn | 73/317 |
| 2,993,184 | 7/1961 | Mims et al. | 338/157 X |
| 3,200,646 | 8/1965 | Donko et al. . | |
| 3,774,449 | 11/1973 | Carol, Jr. . | |
| 4,114,130 | 9/1978 | Sutton et al. . | |
| 4,139,750 | 2/1979 | Rau . | |
| 4,637,254 | 1/1987 | Dyben et al. . | |
| 4,790,185 | 12/1988 | Fedelem et al. | 73/317 |
| 4,825,695 | 5/1989 | Ohtani | 73/317 |
| 4,870,961 | 10/1989 | Ohtani et al. . | |
| 4,928,526 | 5/1990 | Weaver . | |
| 4,951,506 | 8/1990 | Lew . | |
| 5,000,044 | 3/1991 | Duffy et al. | 73/317 |
| 5,079,950 | 1/1992 | McKiernan et al. | 73/319 X |

Primary Examiner—Daniel M. Yasich
Attorney, Agent, or Firm—Reising, Ethington, Barnard, Perry & Milton

[57] ABSTRACT

A fuel level sender (10) utilized a float (14) pivotally connected to a resistive rheostat (20) for varying a measurement signal in response to pivotal movement of the float (14) and therefore level of liquid in a container (12). The rheostat (20) includes an arcuate card helically wound by a conductive wire (70) wherein a ball bearing (80) biased by a spring (83) is pivotally connected to the float (14) such that the ball bearing (80) rolls along the arcuate card to change the resistance provided by the wire (70). The rheostat (20) is supported within the channel (25) of a threesided U-channel extrusion (24). A mounting boss (45) providing a four sided internal cavity receives an end of the extrusion (24) therein. The boss (45) and extrusion (24) may be separated to incrementally vary the orientation therebetween. The mounting boss (45) is integrally connected to a flange plate (28) having molded-in terminals for receiving electrical wires from the rheostat (20).

29 Claims, 2 Drawing Sheets

5,216,919

FUEL LEVEL SENDER

TECHNICAL FIELD

The invention relates to a float operated fuel level sender, and more particularly to a fuel level sender having a float controlling a rheostat within a container holding fuel wherein the level signal is provided external the container.

BACKGROUND OF THE INVENTION

Fuel level senders for automotive vehicles conventionally include a float carried on the end of a long pivoting arm suspended within the interior of the fuel tank. The arm is connected to a wiper assembly having a contact slidably engaging a wire wound rheostat that varies in resistance in accordance with the position of the float and therefore the position of the wiper ont he rheostat.

U.S. Pat. No. 2,434,425 issued Jan. 13, 1948 in the name of Muller discloses an apparatus for gauging the level of liquids which uses a floating body that reacts to change in the level of the liquid. This in turn changes the position of a roller across a rheostat. This roller is disk shaped and pivots around a pivot point providing movement across the rheostat.

It is also desirable to allow change in directional orientation of the float in various fuel tank configurations. U.S. Pat. No. 3,200,646 issued Aug. 17, 1965 in the name of Donko et al discloses a liquid level indicating device which uses the float attached to a float arm to create changes in the resistance of a rheostat corresponding to the changes in the liquid level. The assembly includes a cover plate and a support bar attached thereto. The float arm and rheostat assembly are attached to this bar by means of a clamp. The clamp contains a round sleeve which enables it to fit over the round support bar and be tightened into place by a nut means. The bracket can be placed at any height and rotated at any analog angle along the support bar.

SUMMARY OF THE INVENTION

The invention is a level measuring apparatus which comprises float means responsive to the level of liquid in a container, rheostat means operatively connected the float means for producing a measurement signal indicative of level of the liquid, and housing means for supporting the rheostat means and for transmitting the measurement signal external the container. The invention further includes the rheostat means including resistive means providing a longitudinal conductive surface and contact means for contacting the longitudinal conductive surface to vary the measurement signal. The contact means includes ball means for rolling along the conductive surface and biasing means operatively connected the ball means for biasing the ball means against the conductive surface.

The invention also includes the housing means having a sleeve supporting the rheostat means and a flange plate having first and second sides. The flange plate provides inset molded terminals extending therefrom for receiving on the first side and transmitting on the second side the measurement signal and for sealing the liquid on the first side preventing the liquid from communication to the second side.

The apparatus also includes the sleeve having a plurality of straight sides f equal width, and the mounting means mounted over the sleeve and having complimentary sides with the sleeve such that the mounting means is removably rotatable in fixed increments with the sleeve to orient the rheostat means and the float means within the container at variable incremental angles.

Furthermore, the invention includes the sleeve comprising a U-channel extrusion for receiving the rheostat means within said U-channel with the float means extending therefrom.

BRIEF DESCRIPTION OF THE DRAWINGS

Features and advantages of the subject invention will be readily appreciated from the following description of the preferred embodiment when taken in conjunction with the accompanying drawings wherein.

DESCRIPTION OF THE PREFERRED EMBODIMENTS

Figure 1:
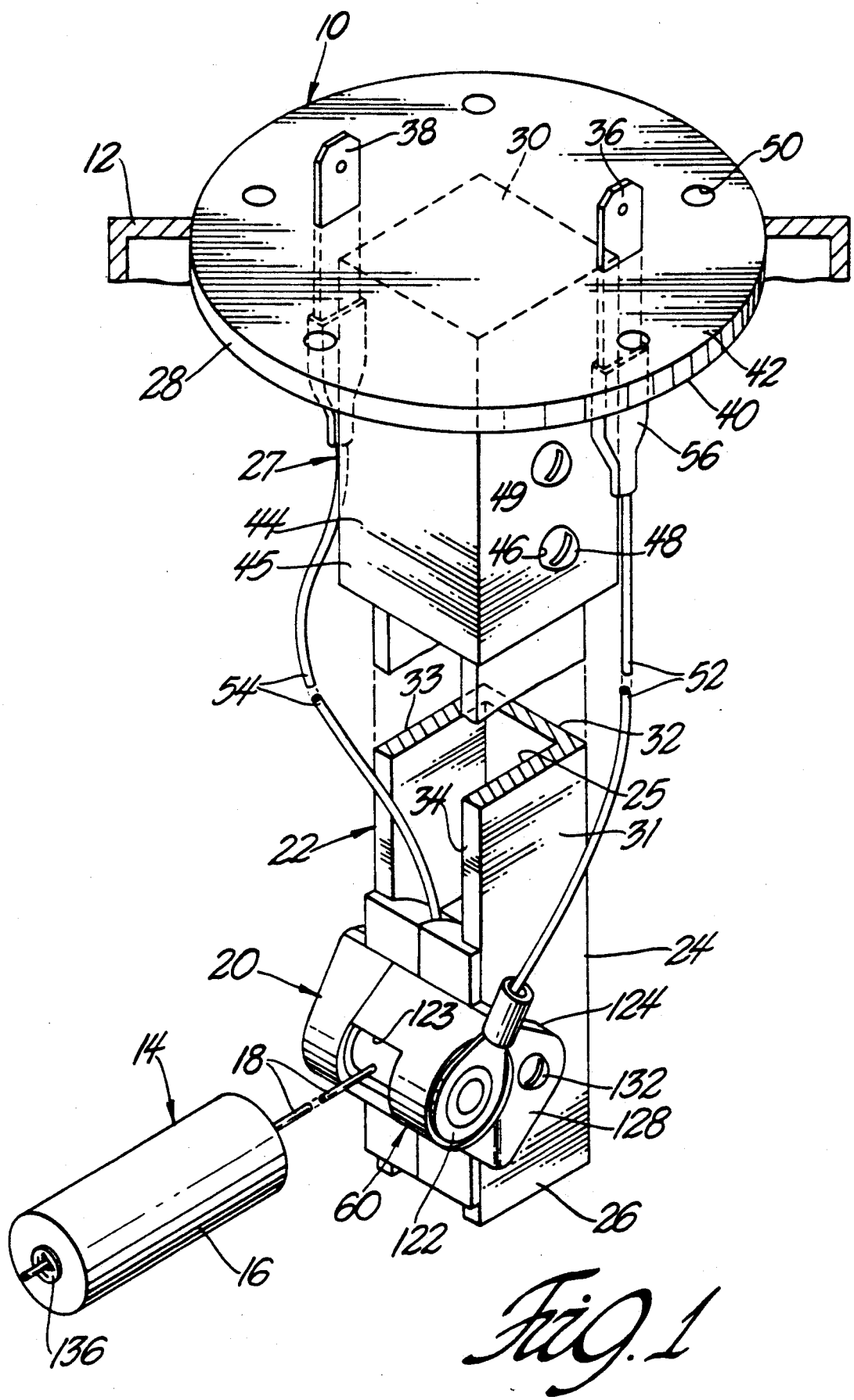
FIG. 1 is a perspective view of the subject invention.

A fuel level sender apparatus for sensing the level of fuel in a container 12 is generally illustrated at 10 in FIG. 1. the fuel level sender apparatus 10 provides an electrical signal output which is indicative of level of fuel in the container 12. It is to be understood that the subject apparatus 10 may be utilized for determining the height of various other types of liquids in holding tanks or containers.

The apparatus 10 includes float means 14 responsive to the level of liquid in the container 12. The float means 14 comprises a generally spherical or cyndrical foam or cork float 16 i.e., porous, having an aperture 17 therethrough which is connected to a float arm 18. The float 16 floats on the surface of the liquid. The float arm 18 generally comprises a rigid nonferrous material in the form of a solid thin shaft which maintains its form or configuration. The float arm 18 is generally straight, but may be permanently bent if necessary.

The float 16 receives the float arm 18 through its aperture 17 and is secured to the float arm 18 by a pair of push on fasteners 136 secured at each end of the float 16 about the float arm 18.

The float arm 18 is in turn connected to rheostat means 20. The rheostat means 20 is operatively connected the float means 14 for producing a measurement signal indicative of level of the liquid in the container 12, as will be subsequently discussed.

The rheostat means 20 is secured within housing means 22. The housing means 22 supports the rheostat means 20 and transmits the measurement signal external the container 12.

The housing means 22 includes support means 24 supporting the rheostat means 20 at a first end 26 thereof and mounting means 27 attached at a second end 30 thereof for mounting the apparatus 10 to the container 12. The support means 24 comprises a sleeve comprising a U-channel extrusion having a channel 25 for receiving the rheostat means 20 therein. The U-channel extrusion 24 provides three side plates 31, 32, 33 of equal width and length connected at 90° angles with a fourth opened side 34. The mounting means 27 includes a flange plate 28, generally a circular flat plate molded of plastic with insert molded in terminals 36, 38. The flange plate 28 has first and second sides 40, 42 wherein the terminals 36, 38 extend through the flange plate 28 and project from both the first and second sides 40, 42. The terminals 36, 38 provide male terminals for transmitting the measurement signal, as subsequently discussed. The molded terminals 36, 38 seal the liquid on the first side 40 preventing the liquid from communication to the second side 42.

The mounting means 27 also includes orientation means 44 for connecting the flange plate 28 to the sleeve 24. The orientation means 44 includes a square mounting boss 45 having four sides of equal width complimenting the configuration of the sides 31-34 of the sleeve 24. The internal widths of the sides of the mounting boss 45 are slightly greater than the width of the sides 31-34 to enable the boss 45 to slide over the sleeve 24. The mounting means 44 includes apertures 46 therethrough on two sides thereof for receiving mounting screws 48 and 49 therein to secure the boss 45 against the sleeve 24. The flange plate 28 also includes a plurality of apertures 50 spaced circumferentially about the plate 28 for receiving fasteners (not shown) to sealingly secure the flange plate 28 to the container 12.

A ground wire 52 and supply wire 54 extend between the rheostat means 20 and the terminals 36, 38 for providing the measurement signal to the terminals 36, 38. The wires 52, 54 include female terminal members 56 for connection to the terminals 36, 38 on the first side 40 thereof. It is to be understood that a second pr of wires and female terminals will be connected to the terminals 36, 38 on the second side 42 of the flange plate 28 in order to provide the measurement signal to the vehicle control computer or gage.

Figure 2:
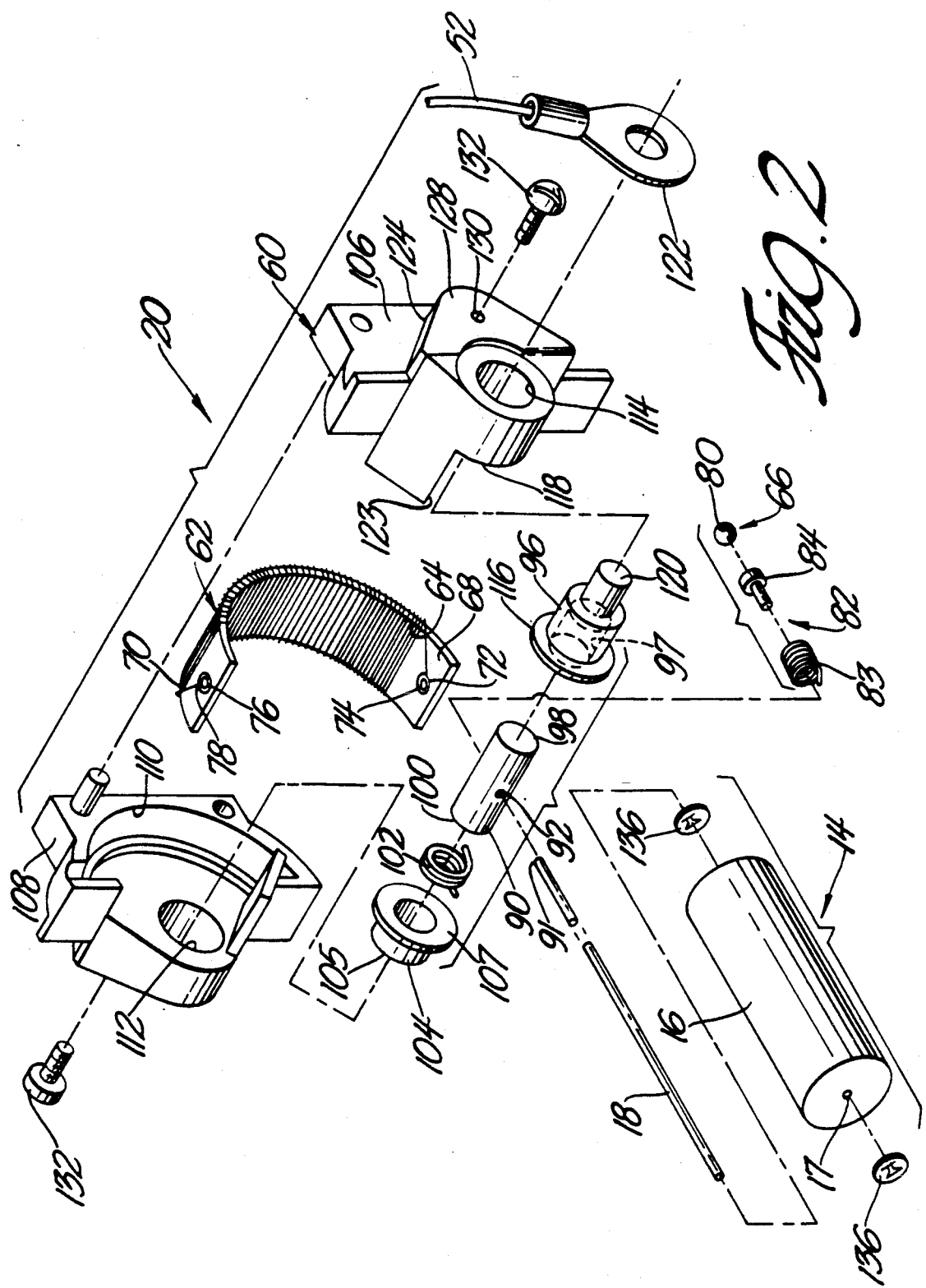
FIG. 2 is an exploded view of the rheostat means.

The rheostat means 20 is secured within the U-channel 25 of the sleeve 24 at the first end 26 thereof. The rheostat means 20 is more specifically illustrated in FIG. 2. The rheostat means 20 includes rheostat housing means 60 for connection to the sleeve 24. Also included is resistive means 62 providing a longitudinal conductive surface 64. Contact means 66 contacts the longitudinal conductive surface 64 to vary the measurement signal. The contact means is operatively connected to the float arm 18.

More particularly, the resistive means 62 comprises a semi-circular or arcuate card 68 having a conductive wire 70 wrapped thereabout providing the conductive surface 64. The wire 70 includes a first end 72 fixedly connected to the card 68 by a fastener 74. The wire 70 is helically wound around the card 68 and is connected to a fastener 76 at a second end 78 of the card. The fastener 76 is connected to the positive wire 54 to provide the measurement signal dependent upon the location of the contact means 66 along the conductive surface 64.

The contact means 66 includes ball means 80 for rolling along the conductive surface 64 and biasing means 82 operatively connected with the ball means 80 for biasing the ball means 80 against the conductive surface 64. The ball means 80 generally comprises a ball bearing. The biasing means 82 comprises a coiled or plunger spring 83 and a plunger eyelet 84. The plunger eyelet 84 includes a stem to receive the coiled spring 83 thereabout and an eyelet portion providing a pocket for receiving the ball bearing partially therein providing a surface at which the ball bearing 80 may rotate and pivot. A brass pivot pin 90 has a float aperture 92 formed therein for receiving the float arm 18 therethrough; the arm 18 projects from the opposing side of the pivot pin 90. The end 91 of the arm 18 receives the plunger eyelet 84 thereabout, along with the spring 83. A ground eyelet 96 is connected at a first end 98 of the brass pivot pin 90. The ground eyelet 96 includes a pocket 97 therein for rotatably receiving the first end 98 of the pivot pin 90. The second end 100 of the brass pivot pin 90 includes a coiled contact spring 102 abutting the end thereof and receiving a closed eyelet 104 thereagainst.

The rheostat housing means 60 comprises a ground housing half 106 and a complimenting housing half 108. The housing halves 106, 108 are secured to one another with the resistive means 62 and contact means 66 secured therein. More particularly, the housing halves 106, 108 each include a semi-circular cavity 110 therein for receiving and supporting the card 68. The complimentary housing half 108 includes a bore 112 therein for receiving the cap end 105 of the closed eyelet 104 with a flange 107 of the eyelet 104 abutting the interior surface of the housing half 108. The ground housing half 106 includes an aperture 114 formed therein for receiving the ground eyelet 96 therethrough. The ground eyelet 96 includes a flange 116 for abutting on the interior side 118 of the housing half 106 to prevent removal of the ground eyelet 96. The ground eyelet incudes a terminal 120 extending through and from the aperture 114 external the housing half 106 and is received by a ring terminal 122 connected to the ground wire 52. The pivot pin 90, along with the other members attached thereto, are therefore pivotly secured between the bore 112 and the aperture 114 allowing pivoting of the floating arm 18 while responsively moving the ball bearing 80 along the contact surface 64. The housing halves 106, 108 provide an opening 123 adjacent the pivot pin 90 to allow pivoting movement of the float arm 18. The housing halves 106, 108 include grooves 124, formed in the outside thereof, the grooves forming parallel arms 128. The arms 128 includes an aperture 130 therein for receiving a housing screw 132. The housing halves 106, 108 are fit within the U-channel 25 with the grooves 24 abutting the ends of the sides 31, 33 therein such that the arms 128 extend over the external side of the sides 31, 33 of the U-channel extrusion 24. The housing screws 132 secure the arms 128 to the walls of the extrusion 24.

In operation, as the liquid level is increased in the container 12, the float 16 rises on the surface of the liquid thereby pivoting the float arm 18 with respect to the rheostat means 20. The pivot pin 90 pivots within the housing 60 in response to movement of the float arm 18, which in turn causes the ball bearing 80 to roll along the wire 70 toward the first end 77 of the card 68 which increases or decreases the amount of resistance in the wire 70 by allowing more length of the wire between the ground and supply wires 52, 54, which in turn produces the measurement signal. As the float 16 pivots downwardly, e.g., decrease in fuel level, the ball bearing 80 rolls toward the second end 78 of the card therefore decreasing the resistance. The float 16 may pivot in a 100° sweep with respect to FIG. 1. Use of the ball bearing 80 and biasing spring 82 minimizes wear on the resistor wire 70 and maintains correct contact pressure on the resistor wire 70 by allowing rolling of the ball bearing 80 rather than wiping across the wire as in the prior art. This eliminates some wear and possible breakage of the wire 70.

The orientation of the sleeve 24 with respect to the flange plate 28 and mounting boss 45 may be incrementally change. The fasteners 49 may be loosened or disconnected in order to remove the mounting boss 45 from the sleeve 24. The sleeve 24 is pivoted by 90° incremental angles therein to obtain the proper orientation of the float means 14 in the fuel tank or container 12. The fasteners 48, 49 are reassured.

Use of the U-channel 25 the housing for the rheostat means 20 allows locking the rheostat housing 60 together and allows for a smaller package size to allow access to smaller entry holes in the fuel tank or container 12. Furthermore, uses of the plastic flange plate 28 with insert molded in terminals 36, 38 eliminates a gasketed stud arrangement which is currently used which has a tendency to leak.

All of the material used to make the apparatus 10 are of nonferrous materials, e.g., stainless steel, which won't rust or be attacked by out gassing effects by polyethylene fuel tanks.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed:

1. A level measuring apparatus comprising:
float means (14) responsive to the level of liquid in a container (12);
rheostat means (20) operatively connected said float means (14) for producing a measurement signal indicative of level of the liquid;
said rheostat means (20) including resistive means (62) providing a longitudinal conductive surface (64) and a contact means (66) for contact said longitudinal contact surface (64) to vary said measurement signal;
said contact means (66) including ball means (80) for rolling along said conductive surface (64) and a biasing means (82) operatively connected with said ball means (80) for biasing said ball means (80) against said conductive surface (64),
said resistive means (62) comprising an arcuate card (68) and conductive wire (70) helically wrapped along said card (68) wherein said ball means (80) rolls along said arcuate card (68) contacting said wire (70),
said float means (14) comprising a float (16) for floating on the surface of liquid, a float arm (18) connected to said float (16), and a pivot pin (90) connected to said float arm (18) for receiving said biasing means (82) and said ball means (80) and for pivoting in response to the level of liquid to move said ball means (80) longitudinally along said arcuate card (68), and
said pivot pin (90) comprising a bore (94) therein, said biasing means comprising a coil spring (82) and a plunger eyelet (84) adjacent said spring (82) for receiving said ball means (80) and for biasing said ball means (80) against said card, said ball means (80) comprising a ball bearing received by said plunger eyelet (84) for biasing against said card (68).

2. An apparatus as set forth in claim 1 further characterized by said rheostat means (20) comprising rheostat housing means (60) having a first and second half (106, 108) for receiving said resistive means (62) and said contact means (66).

3. An apparatus as set forth in claim 2 further characterized by said housing means (22) including the U-channel extrusion for receiving said rheostat means (20) within said channel to maintain said first and second halves (106, 108) secured to one another.

4. A level measuring apparatus comprising:
float means (14) responsive to the level of liquid in a container (12);
rheostat means (20) operatively connected to said float means (14) for producing and transmitting a measurement signal indicative of level of the liquid external of the container;
housing means (22) for supporting said rheostat means (20) to the container;
said housing means (22) including support means (24) for supporting said rheostat means (20) in a mounted position thereon and mounting means (44) having first and second sides and operatively attached to said support means (24) and providing insert mold terminals (36, 38) molded with and extending through said mounting means for receiving on said first side and transmitting on said second side said measurement signal and for sealing the liquid on said first side preventing the liquid from communication to said second side.

5. An apparatus as set forth in claim 4 further characterized by said mounting means (27) including a plastic molded flanged mounting plate (28) with a pair of electrically conductive terminals molded therein and extending therefrom.

6. An apparatus as set forth in claim 5 further characterized by said mounting means (27) including orientation means (44) for connecting and orientating said plate (28) with said support means (24).

7. An apparatus as set forth in claim 6 further characterized by said support means (24) comprising a sleeve extrusion having a plurality of sides of equal width and connection angle therebetween.

8. An assembly as set forth in claim 7 further characterized by said orientation means (44) comprising a mounting boss having a plurality of sides of equal width and connection angle therebetween with the number of sides equal to the number of said sides of said sleeve extrusion for receiving said sleeve extrusion therein and for allowing removal and incremental rotational replacement of said sleeve extrusion to allow various incremental orientations of said sleeve extrusion with respect to said mounting boss.

9. An apparatus as set forth in claim 8 further characterized by said rheostat means (20) including resistive means (62) responsive to said float means (14) for receiving and changing an electrical signal dependent upon the level, a pair of conductive wires (52, 54) connected between said resistive means (62) and said terminals (36, 38) for supplying and returning said electrical signal.

10. An apparatus as set forth in claim 9 further characterized by said resistive means (62) providing a longitudinal conductive surface (64) and including contact means (66) for contacting said longitudinal contact surface (64) to vary said measurement signal.

11. An apparatus as set forth in claim 10 further characterized by said assembly characterized by said contact means (66) including ball means (80) for rolling along said conductive surface (64) and a biasing means (82) operatively connected with said ball means (80) for biasing said ball means (80) against said conductive surface (64).

12. An apparatus as set forth in claim 11 further characterized by said resistive means (62) comprising a arcuate card (68) and conductive wire (70) helically wrapped along said card (68) wherein said ball means (80) rolls along said arcuate card (68) contacting said wire (70).

13. An apparatus as set forth in claim 12 further characterized by including said float means (14) comprising a float (16) for floating on the surface of liquid, float arm (18) connected to said foam float (16), and a pivot pin (90) connected to said float arm (18) for receiving said biasing means (82) and said ball means (80) and for pivoting in response to the level of liquid to move said ball means (80) longitudinally along said arcuate card (68).

14. An apparatus as set forth in claim 4 further characterized by said rheostat means (20) comprising rheostat housing means (60) having a first and second half (106, 108) for receiving said resistive means (62) and said contact means (66).

15. An apparatus as set forth in claim 14 further characterized by said housing means (22) including the U-channel extrusion for receiving said rheostat means (20) within said channel to maintain said first and second halves (106, 108) secured to one another.

16. A level measuring apparatus comprising:
float means (14) responsive to the level of liquid in a container (12);
rheostat means (20) operatively connected to said float means (14) for producing and transmitting a measurement signal indicative of level of the liquid external of the container;
housing means (22) for supporting said rheostatic means and for transmitting said measurement signal external the container;
said housing means (22) including a sleeve having a plurality of sleeve sides of equal width and of equal connection angle between each side for supporting said rheostat means (20) in a mounted position thereon, and mounting means mounted over and in engagement with said sleeve and having complimentary sides therewith and adjacent said sleeve sides for allowing removal and rotation in limited fixed increments of said sleeve with said mounting means and reengagement thereof to orient said rheostat means and said float means within the container at variable fixed incremental angles with respect to said mounting means, with said incremental angles based upon the connection angle.

17. An apparatus as set forth in claim 16 further characterized by said sleeve comprising a U-channel extrusion formed by three closed sides and a fourth open side, and said mounting means including a cavity providing four sides extending over the complementing said U-channel extrusion through an open end thereof.

18. An apparatus as set forth in claim 17 further characterized by said mounting means (27) including a plastic molded plate (28) with a pair of electrically conductive terminals molded therein and extending therefrom.

19. An apparatus as set forth in claim 18 further characterized by said mounting means (27) including a mounting boss integrally connected with said plate (28) establishing said cavity.

20. An apparatus as set forth in claim 17 further characterized by said rheostat means (20) comprising rheostat housing means (60) having a first and second half (106, 108) for receiving said resistive means (62) and said contact means (66) and said housing means (22) including the U-channel extrusion for receiving said rheostat means (20) within said channel to maintain said first and second halves (106, 108) secured to one another.

21. A level measuring apparatus comprising:
float means (14) responsive to the level of liquid in a container;
rheostat means (20) operatively connected to said float means (14) for producing and transmitting a measurement signal indicative of level of the liquid external of the container;
housing means (22) adapted to be connected to the container for supporting said rheostat means (20) to the container;
said housing means (22) including support means comprising a U-channel extrusion providing a channel therein for receiving said rheostat means (20) within said channel with said float means (14) extending outwardly and away from said channel.

22. An apparatus as set forth in claim 21 further characterized by said rheostat means (20) comprising rheostat housing means (60) having a first and second half (106, 108) for receiving said resistive means (62) and said contact means (66) and said housing means (22) including the U-channel extrusion for receiving said rheostat means (20) within said channel to maintain said first and second halves (106, 108) secured to one another therein.

23. An apparatus as set forth in claim 21 further characterized by said rheostat means (20) including resistive means (62) responsive to said float means (14) for receiving and changing an electrical signal dependent upon the level, a pair of conductive wires (52, 54) connected between said resistive means (62) and said terminals (36, 38) for supplying and returning said electrical signal.

24. An apparatus as set forth in claim 23 further characterized by said resistive means (62) providing a longitudinal conductive surface (64) and including contact means (66) for contacting said longitudinal contact surface (64) to vary said measurement signal.

25. An apparatus as set forth in claim 24 further characterized by said assembly characterized by said contact means (66) including ball means (80) for rolling along said conductive surface (64) and a biasing means (82) operatively connected with said ball means (80) for biasing said ball means (80) against said conductive surface (64).

26. An apparatus as set forth in claim 25 further characterized by said resistive means (62) comprising a arcuate card (68) and conductive wire (70) helically wrapped along said card (68) wherein said ball means (80) rolls along said arcuate card (68) contacting said wire (70).

27. An apparatus as set forth in claim 26 further characterized by including said float means (14) comprising a float (16) for floating on the surface of liquid, float arm (18) connected to said float (16), and a pivot pin (90) connected to said float arm (18) for receiving said biasing means (82) and said ball means (80) and for pivoting in response to the level of liquid to move said ball means (80) longitudinally along said arcuate card (68).

28. An apparatus as set forth in claim 27 further characterized by said rheostat means (20) comprising rheostat housing means (60) having a first and second half (106, 108) for receiving said resistive means (62) and said contact means (66).

29. An apparatus as set forth in claim 28 further characterized by said housing means (22) including the U-channel extrusion for receiving said rheostat means (20) within said channel to maintain said first and second halves (106, 108) secured to one another.

* * * * *